United States Patent [19]
Weir

[11] Patent Number: 5,651,916
[45] Date of Patent: Jul. 29, 1997

[54] PROCESS FOR THE PREPARATION OF A PROPYLENE GLYCOL ANTIFREEZE CONTAINING AN ALKALI METAL SILICATE

[75] Inventor: Thomas W. Weir, Berwyn, Pa.

[73] Assignee: Prestone Products Corporation, Danbury, Conn.

[21] Appl. No.: 518,154

[22] Filed: Aug. 23, 1995

[51] Int. Cl.$^6$ .................................................. C09K 5/00
[52] U.S. Cl. ........................... 252/74; 252/75; 252/77; 252/392
[58] Field of Search ........................... 252/75, 77, 392, 252/78.3, 74

[56] References Cited

U.S. PATENT DOCUMENTS

| | | | |
|---|---|---|---|
| 2,147,409 | 2/1939 | Lamprey | 252/5 |
| 2,373,570 | 4/1945 | Keller | 252/75 |
| 2,566,923 | 8/1951 | Burghart | 252/76 |
| 2,726,215 | 12/1955 | Jones | 2552/389 |
| 3,960,740 | 6/1976 | Truett | 252/73 |
| 4,000,079 | 12/1976 | Rasp et al. | 252/70 |
| 4,149,965 | 4/1979 | Pine et al. | 208/216 |
| 4,219,433 | 8/1980 | Manabe et al. | 252/75 |
| 4,242,214 | 12/1980 | Lambert, Jr. | 252/75 |
| 4,338,209 | 7/1982 | Manabe et al. | 252/75 |
| 4,382,008 | 5/1983 | Boreland et al. | 252/75 |
| 4,382,870 | 5/1983 | Abel et al. | 252/75 |
| 4,389,371 | 6/1983 | Wilson et al. | 422/15 |
| 4,414,126 | 11/1983 | Wilson | 252/78.3 |
| 4,450,088 | 5/1984 | Wilson et al. | 252/75 |
| 4,455,248 | 6/1984 | Wood | 252/75 |
| 4,506,684 | 3/1985 | Keritsis | 131/369 |
| 4,545,925 | 10/1985 | Bosen et al. | 2552/389 |
| 4,561,990 | 12/1985 | Darden | 252/75 |
| 4,587,028 | 5/1986 | Darden | 252/76 |
| 4,588,513 | 5/1986 | Triebel et al. | 252/75 |
| 4,717,495 | 1/1988 | Hercamp et al. | 252/75 |
| 4,725,405 | 2/1988 | Cassin et al. | 422/7 |
| 4,759,864 | 7/1988 | Van Neste et al. | 252/75 |
| 4,772,408 | 9/1988 | Mohr et al. | 252/75 |
| 5,064,552 | 11/1991 | Oppenlaender et al. | 252/78.3 |
| 5,422,026 | 6/1995 | Greaney | 252/73 |

FOREIGN PATENT DOCUMENTS 1004259  9/1965  United Kingdom.

*Primary Examiner*—Douglas J. McGinty
*Assistant Examiner*—Charles Boyer
*Attorney, Agent, or Firm*—Cummings & Lockwood

[57] ABSTRACT

The preparation of propylene glycol compositions containing alkali metal silicates having improved gel resistance is provided by forming a silicate premix having effective amounts of inorganic base compound(s) and water. The silicate premix is then added to the propylene glycol.

20 Claims, No Drawings

PROCESS FOR THE PREPARATION OF A PROPYLENE GLYCOL ANTIFREEZE CONTAINING AN ALKALI METAL SILICATE

BACKGROUND OF THE INVENTION

The invention relates to a process for preparing an improved propylene glycol antifreeze containing silicate which is resistant to gellation of the silicate.

Antifreeze compositions comprising ethylene glycol and a wide variety of corrosion inhibitors are well known in the prior art as evidenced by U.S. Pat. Nos. 3,341,469, 3,337,496, 4,241,014 and 4,664,833. Although prior art patents disclose the use of a wide variety of glycols in antifreeze compositions, such patents primarily deal with and provide working examples for ethylene glycol based antifreeze compositions. Further, the prior art has not generally disclosed any criticality of the mixing order of the corrosion inhibitors to the ethylene glycol. Two exceptions to this are found in U.S. Pat. Nos. 3,282,846 (Scott) and 4,149,985 (Wilson). Scott discloses a method for manufacturing an antifreeze involving the mixing order of ethylene glycol, borate, silicate, and sodium mercaptobenzothiazole. Wilson discloses a method for manufacturing an antifreeze involving the mixing order of ethylene glycol, borate, basic inorganic compound (until a pH of from 9.5 to 10.5) and then silicate.

It has been found that the order of mixing disclosed in the Scott and Wilson patents is not applicable to all types of alkylene glycols and is particularly inapplicable for manufacturing propylene glycol antifreeze compositions. U.S. Pat. No. 5,422,026 (Greaney) discloses a phosphate-free corrosion inhibited antifreeze prepared by admixing an aqueous solution comprising silicate, silicate stabilizer (polysiloxane), molybdate, and a relatively small amount of a basic compound, with a solution of an alkylene glycol, preferably, propylene glycol, and the various corrosion inhibitors typically employed, e.g., mercaptobenzotriazole, borate, nitrate, sebacate, tolyltriazole, and the like. Greaney does not recognize or disclose the need for a high pH in the initial silicate premix in achieving long term silicate stability without gel formation. Applicants' invention overcomes the prior art limitations and provides a process for preparing gel resistant propylene glycol antifreeze compositions containing alkali metal silicate.

SUMMARY OF THE INVENTION

It has been discovered that the preparation of propylene glycol antifreeze containing an alkali metal silicate can be improved so as to provide enhanced gel resistance by controlling the amount of basic compound and water of the silicate mixture at the time the propylene glycol and alkali metal silicate are admixed. Such compositions are useful in the manufacture of antifreeze/coolant compositions for use in the cooling systems for internal combustion engines. The invention correlates the concentration of basic compound(s) and water to the alkali metal silicate in a premixed additive ("silicate premix") whereby the silicate has improved gel resistance when added to the propylene glycol.

The instant invention achieves this improvement in resistance to gel formation by use of a "silicate premix" which is employed to prepare compositions containing 85 to 98 weight percent propylene glycol, a corrosion inhibiting amount of an alkali metal silicate, basic compound, water and a silicone. The process of the invention comprises:

(a) preparing a "silicate premix" by admixing an alkali metal silicate, a basic inorganic compound (preferably as an aqueous base solution) to provide a silica to alkali metal oxide mole ratio ($SiO_2:M_2O$) where M is an alkali metal cation, of less than about 0.25, preferably less than about 0.22, and adding an effective amount of water to said premix to provide at least about 60 weight percent water in the silicate premix; and (b) adding the silicate premix of step (a) to said propylene glycol. The above process provides compositions that have improved resistance to gel formation sometimes observed in alkylene glycol-containing antifreeze compositions containing alkali metal silicates.

DETAILED DESCRIPTION OF THE INVENTION

The order of mixing of the ingredients described herein is significantly different than that taught in the prior art so that the pH and water content associated with the alkali metal silicate can be controlled. This is to be contrasted with the prior art. For example, U.S. Pat. No. 4,149,985 teaches the importance of adding borate to an alkylene glycol while maintaining a neutral, acidic or slightly alkaline pH, then raising the pH to from 9.5 to 10.5 by adding a basic inorganic compound, followed by addition of an alkali metal silicate.

The instant invention teaches that it is not necessary to add alkali metal borate to a neutral alkylene glycol as taught by U.S. Pat. No. 4,149,985, if an alkali metal borate or other corrosion inhibitors are to be employed. In fact, it is preferred to add borate, if present, after addition of a silicate premix to the propylene glycol, as will be further discussed hereinafter.

The instant invention provides compositions which are resistant to silicate gel formation by providing the alkali metal silicate in a form wherein it may be added to the propylene glycol with improved resistance to silicate gel formation. The stable form of the silicate employed herein is achieved by forming an "over-alkalized" silicate premix, i.e., an alkali metal silicate solution containing sufficient base to achieve a silica to alkali metal oxide mole ratio ($SiO_2:M_2O$), where "M" is an alkali metal cation, of less than about 0.25, preferably less than about 0.22, with an effective amount of water to solubilize the alkali metal silicate and inorganic basic compound so as to provide the total weight percent (wt %) of water in the premix of at least about 60 wt. % or higher, and preferably, at least about 63 wt. %.

As used herein the term "propylene glycol" shall be understood to mean propylene glycol and mixtures of propylene glycol with one or more of dipropylene glycol, ethylene glycol and diethylene glycol, wherein the propylene glycol comprises greater than about 95 weight percent of any such mixture. As is well known, however, propylene glycol and the propylene glycol mixtures referred to herein can contain up to about 5 weight percent added water.

The basic inorganic compound can be an alkali metal hydroxide, alkali metal carbonate, alkali metal phosphate, and the like, and is preferably sodium or potassium hydroxide.

Alkali metal silicates useful herein include, for example, sodium metasilicate, potassium metasilicate, lithium metasilicate, the corresponding orthosilicates, and the like, and mixtures thereof.

Optional additives can be employed in minor amounts of less than 10 weight percent based on the total weight of the antifreeze composition. Typical optional additives can include, for example, known corrosion inhibitors for metals such as, for example, tungstates, selenates, carbonates and bicarbonates, monocarboxylic acids, sebacates and other dicarboxylic acids, molybdates, borates, phosphates and benzoates, hydroxy benzoates or acids thereof, silicones, alkali metal nitrates, alkali metal nitrites, tolyltriazole, mercaptobenzotriazole, benzotriazole, and the like, or mixtures thereof. If one or more of the known inhibitors are employed together with the inhibitors present in the instant invention, the sum total of all inhibitors should be used in an effective inhibitory amount, i.e., an amount sufficient to provide some corrosion inhibition with respect to the metal surfaces to be protected. Other typical optional additives would include buffers, such as alkali metal borates, phosphates and carbonates; wetting agents and surfactants, such as, for example, known ionic and non-ionic surfactants such as poly (oxyalkylene) adducts of fatty alcohols; antifoaming agents and/or lubricants such as the well known polysiloxanes and the polyoxyalkylene glycols, as well as any other minor ingredients known in the antifreeze/coolant art.

For the purposes of this invention, the gel resistance of the composition is determined by observing the presence or absence of gel formation immediately upon mixing or after sitting quiescently in a closed bottle at 55° C. for a determinate period of time (until gel formation is observed).

As can be seen from the examples, the order of addition of an over-alkalized aqueous silicate premix is a critical feature of the invention, and is not taught by the prior art. The order of addition is related to maintaining silicate solubility in the propylene glycol. First, silicate requires a high pH to be stable. The premix of the present invention maximizes the pH during silicate addition and never allows the pH to be less than the final buffer pH. Second, silicate will condense if dehydrated. The premix of the present invention ensures that a sufficient amount of water is present during admixture with the propylene glycol. While the order of mixing is especially advantageous with propylene glycol, which is less soluble than ethylene glycol, this order of mixing also can be useful in the preparation of other alkylene glycol antifreezes.

Once the silicate is in solution in the premix, further silicate stabilization can be achieved through use of a conventional silicate stabilizer, e.g., the organic and/or inorganic silanes and/or siloxanes disclosed in U.S. Pat. Nos. 4,772,408, 4,725,405, 4,414,126, 5,064,552 and the patents referred to therein, the relevant portions of which are incorporated herein by reference. The silicate stabilizer can be added directly to the propylene glycol or to the premix or to the resulting admixture obtained upon adding the premix to the propylene glycol solution.

The present invention involves the stabilization of the alkali metal silicate with basic inorganic compound and water to form a silicate premix which is then added to the propylene glycol.

Although it is preferred to add corrosion inhibitor compounds to the resultant silicate-containing propylene glycol mixture, the corrosion inhibitor compounds can, if desired, be added to the propylene glycol solution prior to the addition of the silicate premix. Since the corrosion inhibitor compounds can lower the pH, it is preferred that in such instance, additional basic inorganic compounds be added to bring the pH of the propylene glycol solution at least back to the normal pH of propylene glycol, i.e., about 6.0. In this manner, the pH in the final silicate-containing propylene glycol mixture will be at least about 9.0 and, preferably, between about 9.5 and about 11.5.

In one embodiment a mixture is prepared containing between about 92 and 93 weight percent propylene glycol and between about 3.7 and about 3.9 weight percent of a silicate premix.

The rate of addition of the silicate premix to the propylene glycol is related to the pH and water content of the propylene glycol and silicate premix. It is preferred to add the silicate premix either slowly or stepwise in two or more aliquots to the propylene glycol, allowing any cloudiness which may form to clear before continuing the addition of the silicate premix to the propylene glycol. This rate of addition becomes more important where the pH of the propylene glycol or propylene glycol/inhibitors mixture may be low, e.g., having a pH below that of the propylene glycol.

EXAMPLES

The following examples were conducted to demonstrate the improved gel resistance of silicate-containing alkylene glycol compositions formed according to the process of the instant invention as compared to the processes of the prior art.

In the following examples, the following nomenclature is employed.

| NOMENCLATURE | MEANING | SUPPLIER |
| --- | --- | --- |
| PG | Propylene Glycol | |
| Silicone A | Organosiloxane, trade name Silquest ® Y-556-silane | OSi Specialties Danbury, CT |
| Silicone B | Organosiloxane, trade name DC-Q2-6083 | Dow Corning Corporation Midland, MI |
| NaTTZ | Sodium Tolyltriazole | |
| NaMBT aq. | Sodium Mercaptobenzothiazole aqueous | |
| Antifoam A | Polypropylene glycol type antifoaming agent, trade name PM-5150 | Union Carbide Corporation Danbury, CT |
| Antifoam B | Organosiloxane type antifoaming agent, trade name DC-Q2-5067 | Dow Corning Corporation Midland, MI |
| Nasil Gr 40 Cl (trade name) | Mixture of Silicate, KOH, and water having a $SiO_2/M_2O$ mole ratio of 3.22 | Occidental Chemical Dallas, TX |

-continued

| NOMENCLATURE | MEANING | SUPPLIER |
|---|---|---|
| Kasil #6 (trade name) | Mixture of Silicate, KOH, and water having a $SiO_2/M_2O$ mole ratio of 3.29 | The PQ Corporation Valley Forge, PA |
| DI water | Deionized Water | |

Examples A and C are comparative examples. Examples B, D, E, F, G, H, I and J were carried out according to the instant invention. The compositions discussed in the following examples are set forth in Table 1 and Table 2.

Comparative Example A

Example A is a comparative example which demonstrates the effect of adding inhibitors to an alkylene glycol in a "conventional" manner as taught in the prior art. This order of mixing may work for ethylene glycol in some instances but is not generally applicable to other alkylene glycols. This example will be contrasted with Example B, below, where the inhibitor content is identical to that used in this Comparative Example A, but the inhibitors are added according to the process of the instant invention.

A composition was formed by placing propylene glycol in a mixing vessel. Under constant stirring, 20 wt % borax in propylene glycol and phosphoric acid were added. The required amount of basic inorganic compound, 45% KOH in this case, was then added to neutralize acids and provide a pH of about 10.8. Next the silicone is added. Upon addition of the high mole ratio silica/alkali metal oxide mixture ($SiO_2:M_2O \approx 1.81$) the mixture turns cloudy as a silicate gel forms. Although some clearing is noted as additional silicate mixture is added, the mixture is never completely clear of a silicate gel. The final pH of the mixture is about 11.3. Additional components were then added as shown in Table 1.

Example B

Example B demonstrates an alkali metal silicate-containing alkylene glycol made according to the process of the instant invention. the chemical concentrations are substantially the same as employed in Example A, but the mixing order is according to the instant invention.

The selected amount of propylene glycol was placed in a mixing vessel. Next, under constant stirring, a silicate premix consisting of alkali metal silicate, basic inorganic compound, and water was added slowly. (The $SiO_2:M_2O$ mole ratio was 0.13). Addition of the silicate premix to the propylene glycol was achieved by adding a small aliquot of the silicate premix and waiting for the mixture to substantially clear before adding the next silicate premix aliquot. Addition of the silicate premix took about 2 hours and about 12 aliquot additions in substantially equal amounts. The silicone was then added. The remaining components, e.g., the inhibitors and any additional components were then added. No silicate gel formation was observed after completing the silicate premix addition. No silicate gel was observed after storage at 55° C. for one year.

Comparative Example C

Comparative Example C demonstrates how silicate gel formation can arise if the process of the instant invention is not employed in the manufacture of silicate-containing propylene glycol compositions. Comparative Example C exhibited a persistent silicate gel upon addition of the silicate to the propylene glycol.

In Comparative Example C, the selected amount of propylene glycol was placed in a mixing vessel. The benzoic acid and phosphoric acid were mixed and then added to the mixture, followed by addition of the silicone. The silicate premix contained alkali metal silicate, all required basic inorganic compound (with a $SiO_2: M_2O$ ratio of 0.12 as shown in Table 1), and water. The pH was observed to rise from less than 3 initially to about 10.8 after all the silicate premix was added. Comparative Example C was always cloudy and contained a silicate gel after storage.

Example D

Example D has the same composition as Comparative Example C, however, the composition is prepared according to the process of the instant invention.

The selected amount of propylene glycol was placed in a mixing vessel. The silicate premix was added over time in a number of aliquots. The initial aliquot was added and produced a slight cloudiness which quickly cleared. Subsequent aliquots produced less and less cloudiness upon addition. The silicone, corrosion inhibitors, and additional components were then added. No cloudiness was observed for the mixture and no silicate gels are detected after storage at 55° C. for 3 months.

TABLE 1

| | (Weight Percents) | | | |
|---|---|---|---|---|
| Component | Comparative Example A | Example B | Comparative Example C | Example D |
| Propylene glycol (PG) | 95.1783 | 95.1783 | 93.4176 | 93.3194 |
| Benzoic Acid | | | 0.9703 | 0.9703 |
| 20% Borax in PG | 1.5000 | 1.5000 | | |
| 75% $H_3PO_4$ | 0.6000 | 0.6000 | 1.1411 | 1.1411 |
| Silicone A | | | 0.0775 | 0.0775 |
| Silicone B | 0.0282 | 0.0282 | | |
| 45% KOH | 1.3777 | | | |
| 50% NaOH | 0.0313 | | | |
| Nasil Gr 40 Cl | 0.1601 | | | |

TABLE 1-continued

| (Weight Percents) | | | | |
|---|---|---|---|---|
| Silicate premix* | | 1.6535 | 3.7190 | 3.157 |
| 50% NaTTZ (aq.) | 0.1100 | 0.1100 | 0.2330 | 0.2330 |
| 50% NaMBT | 0.1100 | 0.1100 | | |
| 40% NaNO$_3$ | 0.5000 | 0.5000 | | |
| 35.1% NaMoO$_4$ | 0.3000 | 0.3000 | | |
| Alizarine Dye | | | 0.0015 | 0.0030 |
| Antifoam A | | | 0.4400 | 0.4400 |
| Antifoam B | 0.0200 | 0.0200 | | |
| The silicate premix in each of the above examples was: | | | | |
| *Silicate premix | A | B | C | D |
| Nasil GR 40 Cl | | 0.1601 | | |
| 50% NaOH | | 0.0313 | | |
| Kasil #6 | | | 0.3418 | 0.3418 |
| 45% KOH | | 1.3777 | 3.1272 | 3.2239 |
| DI Water (added) | | 0.0844 | 0.2500 | 0.2500 |
| Mole Ratio, SiO$_2$/M$_2$O | 1.81 | 0.13 | 0.12 | 0.11 |
| Total % Water in Premix | 73.4 | 64.1 | 64.7 | 64.6 |

Examples E to I

Examples E to I, Table 2, demonstrate the gel resistance benefits derived by use of the instant invention for a wide variety of antifreeze formulations. The compositions of Examples E to I, inclusive, were prepared according to the instant invention by adding an aqueous mixture of highly alkalized silicate directly to the propylene glycol.

Example J

The corrosion protection properties of the compositions prepared in Examples B and E were evaluated according to ASTM D 4340-89, "Standard Test Method for Aluminum alloys in Engine Coolants Under Heat-Rejecting Conditions" and ASTM D 1384-93, "Standard Test Method for Corrosion Test for Engine Coolants in Glassware" to dem-

TABLE 2

| (Weight Percents) | | | | | |
|---|---|---|---|---|---|
| Component | Example E | Example F | Example G | Example H | Example I |
| Propylene Glycol ("PG") | 92.8859 | 92.5322 | 94.2936 | 95.7276 | 94.6493 |
| Benzoic Acid | 0.9703 | 1.9406 | | | |
| Boric Acid | | | | 0.8918 | |
| 20% Borax in PG | | | 1.9875 | | 1.9875 |
| 75% H$_3$PO$_4$ | 1.1411 | 0.7607 | 0.6602 | 0.1625 | 0.6602 |
| Silicone A | 0.0775 | 0.0775 | | | |
| Silicone B | | | 0.3100 | 0.0652 | 0.1550 |
| Silicate premix* | 3.5657 | 3.8125 | 2.1322 | 2.4079 | 1.9248 |
| 50% NaTTZ (aq) | 0.3495 | 0.1165 | 0.1165 | 0.2200 | 0.1165 |
| 40% NaNO$_3$ | 0.7500 | 0.7500 | 0.500 | 0.5250 | 0.5000 |
| Alizarine Dye | 0.0030 | 0.0030 | | | |
| Antifoam A | 0.0070 | 0.0070 | | | 0.0067 |
| The silicate premix in each of the above examples was: | | | | | |
| *Silicate premix | E | F | G | H | I |
| Kasil #6 | 0.3418 | 0.3418 | 0.3418 | 0.1778 | 0.1709 |
| 45% KOH | 3.2239 | 3.4707 | 1.61955 | 2.1001 | 1.5830 |
| DI Water (added) | 0.2500 | | 0.1709 | 0.1300 | 0.1709 |
| Mole Ratio SiO$_2$/M$_2$O | 0.11 | 0.10 | 0.22 | 0.09 | 0.11 |
| Total % Water in premix | 64.6 | 62.1 | 65.1 | 64.2 | 65.5 |

The above compositions can be employed as antifreeze compositions for the cooling systems of internal combustion engines and were observed to be gel resistant both during their preparation and after storage at 55° C. for 3 months.

onstrate the improved corrosion protection of compositions prepared according to the instant invention.

The ASTM D 4340 and D 1384 results for Examples B and E, as compared to the ASTM D 3306 and D 5216 requirements for new coolants, demonstrates the excellent protection of aluminum under heat transfer conditions and the overall general corrosion protection afforded to the other metals typically found in an engine cooling system. This excellent protection can be attributed directly to the stable, fully formulated nature of the coolant.

|  | Example B | Example E | ASTM D 3306(a) requirements | ASTM D 5216(b) requirements |
|---|---|---|---|---|
| ASTM D 4340-89 Test Results(c) |  |  |  |  |
| Corrosion Rate, mg/cm²/week | 0.36 | 0.33 | 1.0 max. | 1.0 max. |
| ASTM D 13 84-93 Test Results(d) Weight loss, mg/specimen |  |  |  |  |
| Copper | 6 | 6 | 10 max. | 10 max. |
| Solder | 5 | 3 | 30 max. | 30 max. |
| Brass | 7 | 3 | 10 max. | 10 max. |
| Steel | 3 | 0 | 10 max. | 10 max. |
| Cast Iron | 0 | −1 | 10 max. | 10 max. |
| Cast Aluminum | 2 | 3 | 30 max. | 30 max. |

(a) ASTM D 3306-89, "Standard Specification for Ethylene Glycol Base Engine Coolant for Automobile and Light Duty Service."
(b) ASTM D 5216-91, "Standard Specification for Propylene Glycol Base Engine Coolant for Automobile and Light Duty Service."
(c) The values reported are the average of two runs.
(d) The values reported are the average of three runs. Scrubbing weight losses were not subtracted out. A minus value indicates a weight gain.

What is claimed is:

1. A process for the preparation of propylene glycol-containing antifreeze compositions having improved gel resistance comprising 85 to 98 weight percent propylene glycol, a corrosion inhibiting amount of an alkali metal silicate, at least one basic inorganic compound and water which comprises:
   (a) forming a silicate premix containing alkali metal silicate, a basic inorganic compound selected from the group consisting of alkali metal hydroxide, alkali metal carbonate and alkali metal phosphate, and water, wherein the silica to alkali metal oxide mole ratio ($SiO_2:M_2O$) is less than about 0.25, and adding an effective amount of water to said premix to provide at least about 60 weight percent water in the premix, to thereby prevent gel formation when said silicate premix is added to said propylene glycol; and
   (b) adding the silicate premix of step (a) to said propylene glycol.

2. A process according to claim 1 wherein said silica to alkali metal oxide ratio is less than about 0.22 and said water is present in an amount of at least about 63 percent by weight.

3. A process according to claim 1 wherein at least one silicate stabilizer is added to the propylene glycol prior to addition of the silicate premix.

4. A process according to claim 1 wherein at least one silicate stabilizer is added to the silicate premix prior to said premix being added to the propylene glycol.

5. A process according to claim 1 wherein at least one silicate stabilizer is added to the mixture of step (b).

6. A process according to claim 2 wherein said alkali metal (M) is sodium or potassium.

7. A process according to claim 1 wherein an additional process step comprises
   (c) adding to the mixture of step (b) an effective inhibitory amount of at least one additional corrosion inhibitor.

8. A process according to claim 7 wherein said corrosion inhibitor is at least one member selected from the group consisting of tungstates, molybdates, selenates, carbonates, bicarbonates, monocarboxylic acids, dicarboxylic acids, borates, phosphates, benzoates, alkali metal nitrates, alkali metal nitrites, tolytriazole, mercaptobenzotriazole, benzotriazole and mixtures thereof.

9. A process according to claim 1 wherein the pH of the mixture formed in step (b) is at least 9.0.

10. A process according to claim 9 wherein the pH is between about 9.5 and 11.5.

11. A process according to claim 1 wherein step (b), said silicate premix of step (a) is added to said propylene glycol in two or more aliquots.

12. A process according to claim 11 wherein step (b), said silicate premix of step (a) is added in two or more aliquots and wherein each aliquot is added at an effective rate of addition to prevent gel formation.

13. A process according to claim 1 wherein step (b), said silicate premix of step (a) is slowly added to said propylene glycol to prevent gel formation.

14. A process according to claim 1 wherein an additional process step comprises adding to the propylene glycol prior to step (b) an effective inhibitory amount of at least one corrosion inhibitor.

15. A process according to claim 14 wherein after the addition of said at least one corrosion inhibitor and before the addition of said silicate premix, at least one inorganic base compound is added to the propylene glycol to raise the pH above about 6.0.

16. A process according to claim 15 wherein the final pH of the silicate-containing propylene glycol mixture is at least about 9.0.

17. A process according to claim 16 wherein the pH is between about 9.5 and about 11.5.

18. A process for the preparation of propylene glycol-containing compositions having improved gel resistance comprising 85 to 98 weight percent propylene glycol, an aqueous base solution, a corrosion inhibiting mount of an alkali metal silicate, basic inorganic compound, water and a silicate stabilizer which comprises:
   (a) optionally adding basic inorganic compound selected from the group consisting of alkali metal hydroxide, alkali metal carbonate and alkali metal phosphate, to said propylene glycol;

(b) adding to the propylene glycol of step (a) a silicate premix mixture comprising at least one alkali metal silicate, at least one basic inorganic compound selected from the group consisting of alkali metal hydroxide, alkali metal carbonate and alkali metal phosphate, and water, said silicate premix having a silica to alkali metal oxide mole ratio of about 0.25 or less and at least 63 percent by weight water; and (c) adding an effective amount of silicate stabilizer to the mixture of step (b).

19. A process according to claim 18 wherein one or more additional corrosion inhibitors are added in an effective corrosion inhibiting amount to the mixture of step (c).

20. A process according to claim 18 wherein one or more corrosion inhibitors are added in an effective corrosion inhibiting amount in step (a) and sufficient basic inorganic compound is then added to raise the pH of the propylene glycol to at least about 6.0.

* * * * *